United States Patent [19]

Pritchard

[11] 4,302,712

[45] Nov. 24, 1981

[54] METHOD OF MINIMIZING RESONANCE IN STEPPING MOTOR AND IMPROVED DRIVER THEREFOR

[76] Inventor: Eric K. Pritchard, 1702 Plymouth Ct., Bowie, Md. 20716

[21] Appl. No.: 125,297

[22] Filed: Feb. 27, 1980

[51] Int. Cl.³ ............................................. H02D 5/40
[52] U.S. Cl. ........................... 318/490; 324/158 MG; 318/702; 318/696
[58] Field of Search .............. 318/685, 696, 702, 723, 318/490; 324/158 MG, 158 SM

[56] References Cited

U.S. PATENT DOCUMENTS

| | | | |
|---|---|---|---|
| 3,800,199 | 3/1974 | Weigand | 318/702 X |
| 3,813,589 | 5/1974 | Boice | 318/702 X |
| 4,091,316 | 5/1978 | Friedman | 318/696 X |
| 4,100,471 | 7/1978 | Pritchard | 318/685 |
| 4,115,726 | 9/1978 | Patterson et al. | 318/702 X |
| 4,140,956 | 2/1979 | Pritchard | 318/696 |
| 4,219,767 | 8/1980 | Wimmer | 318/696 |

Primary Examiner—B. Dobeck
Attorney, Agent, or Firm—Leitner, Palan, Martin & Bernstein

[57] ABSTRACT

A stepping motor driver is adjusted to minimize resonance by adjusting a variable frequency source to adjust the fundamental frequency of the drive to the frequency of a filter, driving the driver and motor with the adjusted frequency source, sensing the motion of the motor and providing the sensed motion to an indicator through the filter. The driver is adjusted to minimize the indication. Adjustment at various harmonics are performed by using 1/N the adjusted frequency, where N is the harmonic of interest.

The improved driver includes a plurality of voltage sources adjustable for resonance compensation at the fundamental frequency and 1/N thereof. DC offset, relative gain and orthogonality of the motor driver signal adjustments are provided.

13 Claims, 4 Drawing Figures

STEPPING MOTOR RESPONSE

FILTER RESPONSE

METHOD OF MINIMIZING RESONANCE IN STEPPING MOTOR AND IMPROVED DRIVER THEREFOR

BACKGROUND OF THE INVENTION

This invention relates to stepping motors and to the electronic means for energizing them in response to an input, and more specifically to controlling the resonant effect in stepping motors.

This invention is an improvement upon my U.S. Pat. No. 4,100,471 which discloses a stepping motor driver that electronically subdivides the motor's natural step into many small steps. The disclosed electronics consisted of a voltage divider, analog multiplexers to select a voltage divider tap in response to an input, and output amplifiers for energizing the stepping motor in response to the multiplexer outputs. The disclosure explains further that the resistance value of said voltage divider may be adjusted to minimize the effects of resonance.

Patterson, et al in U.S. Pat. No. 4,115,726 analyzes the harmonic behavior of stepping motors. This analysis led them to create sine and cosine current waveforms for their stepping motor and introduce third harmonic sine and cosine currents to minimize the resonance effects. Although the adjustment procedure is a drive with only third harmonic resonance compensation, it rapidly becomes complex as greater compensation is required.

Stepping motors have energy dissipation limits which demand a limit to the maximum current and limit the average current in their windings. Yet stepping motors also are torque limited and demand as much current as possible.

The analysis which Patterson, et al disclosed in U.S. Pat. No. 4,115,726 uses a number of simplifications which have been found to be invalid. The invalid assumptions are: (1) The motor torque is a linear function of current; (2) The frequency of interest is the resonant frequency of the stepping motor; (3) All harmonics are negligable when compared with the fundamental frequency; (4) The motor resonant frequency is not affected by resonance minimization adjustments, and (5) The motor windings of a two-phase motor are 90° apart.

The stepping motor torque is a function of its magnetic flux which is related to winding currents by motor geometry and the familiar non-linear B-H relationship found in magnetic materials. This non-linear relation is an odd function if hysteresis is neglected. Odd functions produce odd harmonics from spectrally pure inputs.

Although Patterson, et al asserts that odd harmonics are the only harmonics necessary to compensate a stepping motor, this added source of odd harmonics was not anticipated.

Large uncompensated harmonics have frustrated attempts to compensate motor resonance. These harmonics create large forces which react with the motor resonance and torque/displacement non-linearities to produce a motion resistant to adjustment.

A reanalysis of the Patterson, et al analysis showed that the frequency of interest needed to be detectable in the motor motion, a task Patterson et al assigned to the motor's mechanical resonance.

The above adjustment problem occurs primarily when making second harmonic adjustments. Although Patterson, et al asserts that the second harmonic is simply a function of phase gain imbalance, further investigation showed that it is also created by interaction of the first and third harmonics since uncompensated third harmonics can contribute significantly to second harmonic resonance or instability and thereby complicate the adjustment process by demanding third harmonic adjustment at the second as well as the fourth harmonic.

The motor torque is a function of winding current, albeit non-linear. The torque variation for various waveforms can be seen in my paper "Analog Operation of Stepping Motors" in the *Proceedings of the Sixth Annual Symposium on Incremental Motion Control Systems and Devices,* May 1977. Consequently, the resonant frequency, a function of the torque, is a function of winding current. Adjustments in waveshape to avoid resonance, can alter the motor torque which can also alter the resonant frequency. Basically, the torque is changed approximately 20 percent as the waveform changes from a triangle to sine. This will give a 10 percent shift in resonant frequency. Thus the waveshape adjustment appears to be a resonance correction. A separate resonant device which is independent of motor torque avoids this problem.

SUMMARY OF THE INVENTION

An object of the present invention is to provide a means and method for easily adjusting a stepping motor driver to minimize the resonant effects.

Another object of the present invention is to provide a method and apparatus for adjusting a plurality of harmonics of a fundamental frequency.

Still another object of the present invention is to provide a resonant compensation means which provides maximum torque without overheating the stepping motor.

An even further object of the present invention is to provide a method of monitoring the resonant frequency of a stepping motor without the linearity and stability problems created by the stepping motor.

A still even further object of the present invention is to provide a stepping motor driver which is capable of readable adjustment of resonant effects by using a plurality of adjustable voltage sources.

An even still further object of the present invention is to provide a stepping motor driver with adjustment for orthogonality of phase drive signals.

These and other objects are attained by the provision of a motion sensor to monitor the motion of the motor and to provide a signal through a filter to an indicator. The method of adjustment includes selecting a reference frequency of the variable frequency oscillator so that the fundamental frequency of the motor driver is the resonant frequency of the filter. The filter is selected to have a center frequency below the resonant frequency of the motor. Then the stepping motor and driver is operated from the reference frequency and various subharmonics thereof and the stepping motor drive is adjusted to minimize the signal detected by a sensor, selected by a filter, and evaluated by an indicator. The variable frequency oscillator referency frequency is divided by N where N is the harmonic to be adjusted and additional adjustments are made to the driver for each selected harmonic. The driver includes means for adjusting the DC offset, the relative gain of the current paths, the phase relationship or orthogonality of the driver signal current paths, and the waveform shape. While the DC offset is adjusted at the reference frequency, the orthogonality and the gain of the current paths are adjusted at ½ the reference frequency of the variable frequency oscillator, and the waveshape is adjusted at $\frac{1}{2}$, $\frac{1}{4}$ and $\frac{1}{8}$ of the reference frequency. The use of another resonant device as the sensor permits measuring of the resonant response of the motor without the linearity and stability problems created by the motor. The lowering of the operating frequency of the driver below the resonant frequency of the motor aids the adjustment process because the motor's nonlinearities and instabilities are not excited.

A driver having the desired adjustments includes a position command means for producing a position command signal in response to an input. A means responsive to the position command signal develops energization signals for the stepping motor. The position command means includes a voltage divider with means for selecting discrete voltages along the voltage divider. A plurality of adjustable voltage sources are connected along points of the voltage divider. These adjustable voltage sources are adjusted at $\frac{1}{2}$, $\frac{1}{4}$, and $\frac{1}{8}$ of the reference frequency to minimize the indicator to reduce resonance. The energization signal means includes a first and second energization signals at a phased difference. Means are provided interconnecting the first and second means and being adjustable to provide a portion of the first energization signal into the second energization signal in order to achieve a desired phase difference, preferably orthogonality. Each of the first and second energization means include adjustment for DC bias. One of the energization means includes means to adjust the gain relative to the other energization means.

Other objects, advantages, and novel features of the present invention will become apparent from the following detailed description of the invention when considered in conjunction with the accompanying drawings.

DESCRIPTION OF THE PREFERRED EMBODIMENTS

Figure 1:
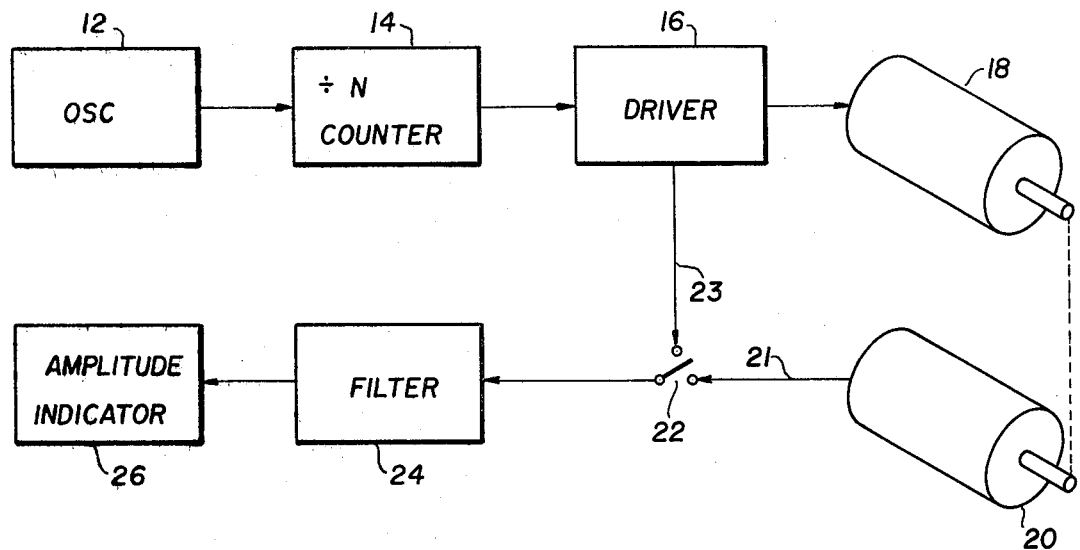
FIG. 1 is a schematic of a system incorporating the principles of the present invention for sensing the resonance of a stepping motor and driver.

A stepping motor adjustment system as illustrated in FIG. 1, consists of a variable frequency oscillator 12 and presettable division counter 14 which controls a stepping motor driver 16. The driver 16 drives motor 18 which produces a motion measured by a sensor 20. Switch 22 selects the sensor output at 21 or a driver test signal at 23 for signal processing by filter 24. Indicator 26 reads out the level of the selected signal.

The general adjustment procedure is to first throw switch 22 to select the driver test signal 23, set the variable division counter 14 to one, and adjust the oscillator frequency to maximize the indicator reading. The oscillator frequency is the reference frequency for the driver 16. By adjusting the oscillator frequency, the fundamental frequency of the driver is matched to the center frequency of the filter 24. The filter 24 is chosen so that its center frequency is below the resonant frequency of the motor. Therefore, by selecting a fundamental frequency of the driver matched to the center frequency of the filter and below the resonant frequency of the motor, the motor will be driven below its resonant frequency during the adjustment process. This aids the adjustment process since the motors nonlinearities and instabilities are not excited below its resonant frequency. The alternative of raising the operating frequency is not practical since the motor response falls off significantly above resonance. This coordinates the input frequency with the filter frequency.

Second, the switch 22 is thrown to select the sensor output 21 and the fundamental frequency adjustments are made to minimize the indicator readout. Third, the variable divider of counter 14 is set to two and the second harmonic adjustments are made. Fourth, the variable divider of counter 14 is set to four, eight, etc. and the appropriate adjustments are made to minimize the indicator read out. Fifth, the process is repeated until satisfactory results are obtained.

Figure 2A:
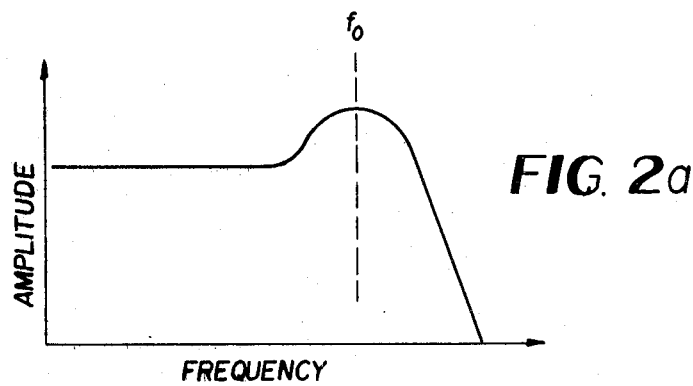
FIGS. 2a and 2b are graphs of the frequency response of a stepping motor and a filter, respectively.
Figure 2B:
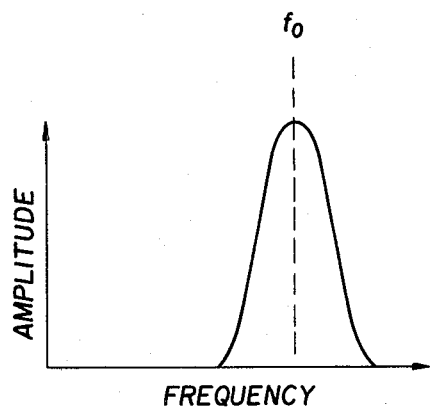

Since the frequency to be detected is in the motor motion, a tachometer 20 is preferably used. The filter 24 forms a resonant device which achieves the same function as the motor resonance without the linearity and stability problems created by the stepping motor. The system uses a low frequency filter 24 such as a two-pole state variable bandpass to achieve a narrow bandwidth. The stepping motor response, as illustrated in FIG. 2A, albeit resonant, is really a low-pass filter. The low-pass filter passes signals which have not yet been minimized and can confuse an unsophisticated indicator. In contrast, the bandpass filter response, illustrated in FIG. 2B, rejects all undesirable signals and allows for a simple indicator such as a meter.

By way of example, the filter 24 may have a center frequency of approximately 1/6 of the resonant frequency of the motor and a bandwidth of approximately 2 HZ. This bandwidth could be wider if the filter response had steeper skirts. The motor position signal fundamental frequency or desired harmonic should be within the bandwidth of the filter.

By using 1/N for adjustment of the $N^{th}$ harmonic, a single filter can be used. Alternatively, a plurality of filters, one for each harmonic can be used provided the highest frequency filter is below the resonant frequency of the motor.

Although a simple meter is effective, a more sophisticated indicator such as an oscilloscope is more effective because it can, if properly used, show the relative phase of the filter output and the driver signals. The relative phase is a better indicator of some adjustments particularly around a null.

A system application, which uses stepping motor drivers of known resolution and which employs accurate frequency source, need not go through the procedure of adjusting the reference frequency so that the fundamental frequency of the position command signal is equal to the resonant frequency of the filter. Furthermore, it is easy to adjust the resonant frequency of filters by changing component values. A potentiometer, preferably a dual potentiometer can adjust a state variable filter easily. Both are known in the electronics art.

The effect of the adjustment system and procedure is to first, make the motion by the stepping motor in one half of the motor's electrical cycle approximately equal to the motion in the other half of the cycle wherein the demarcation between halves may be anywhere. Second, the second harmonic adjustment makes the motion traveled in the odd quarters of the motor's electrical cycle approximately equal to the even quarters of the motor's electrical cycle, independent of quarter demarcation.

The $N^{th}$ harmonic adjustment makes the motion of the stepping motor during the odd 2 $N^{ths}$ of the motors electrical cycle approximately equal to the motion during the even 2 $N^{ths}$, again irrespective of demarcations. Since the driver waveform is independent of frequency, at least in the mechanical resonance region, the lack of resonant behavior at one frequency implies the lack of resonant behavior at another frequency, motor resonance in particular. From another point of view, if the step sizes are all approximately equal, the mechanical resonance can not be excited significantly.

In addition and prior to the adjustment of the driver 16 at the harmonics of the fundamental frequencies to minimize resonance, the driver is also adjusted for other characteristics. The direct current offset of the driver paths are adjusted at the fundamental frequency. The relative gain of the driver current paths are adjusted at one half of the adjusted fundamental frequency. Similarly, the relative phase of the driver current paths to the phase windings are also adjusted at one half of the adjusted frequency. Preferably, the relative phase is adjusted to achieve orthogonality of the sine-cosine relationship of the driver drive signals.

The driver adjustments may be initialized to nominal values prior to the harmonic measurement technique discussed hereinabove by directly measuring driver voltages. The DC offsets and orthogonality adjustments may be set to zero, the phase gain set to 1, and the waveshape adjusting potentiometers set to produce sinusoids or other waveshape generally preferred by the type of motor to be adjusted.

Figure 3:
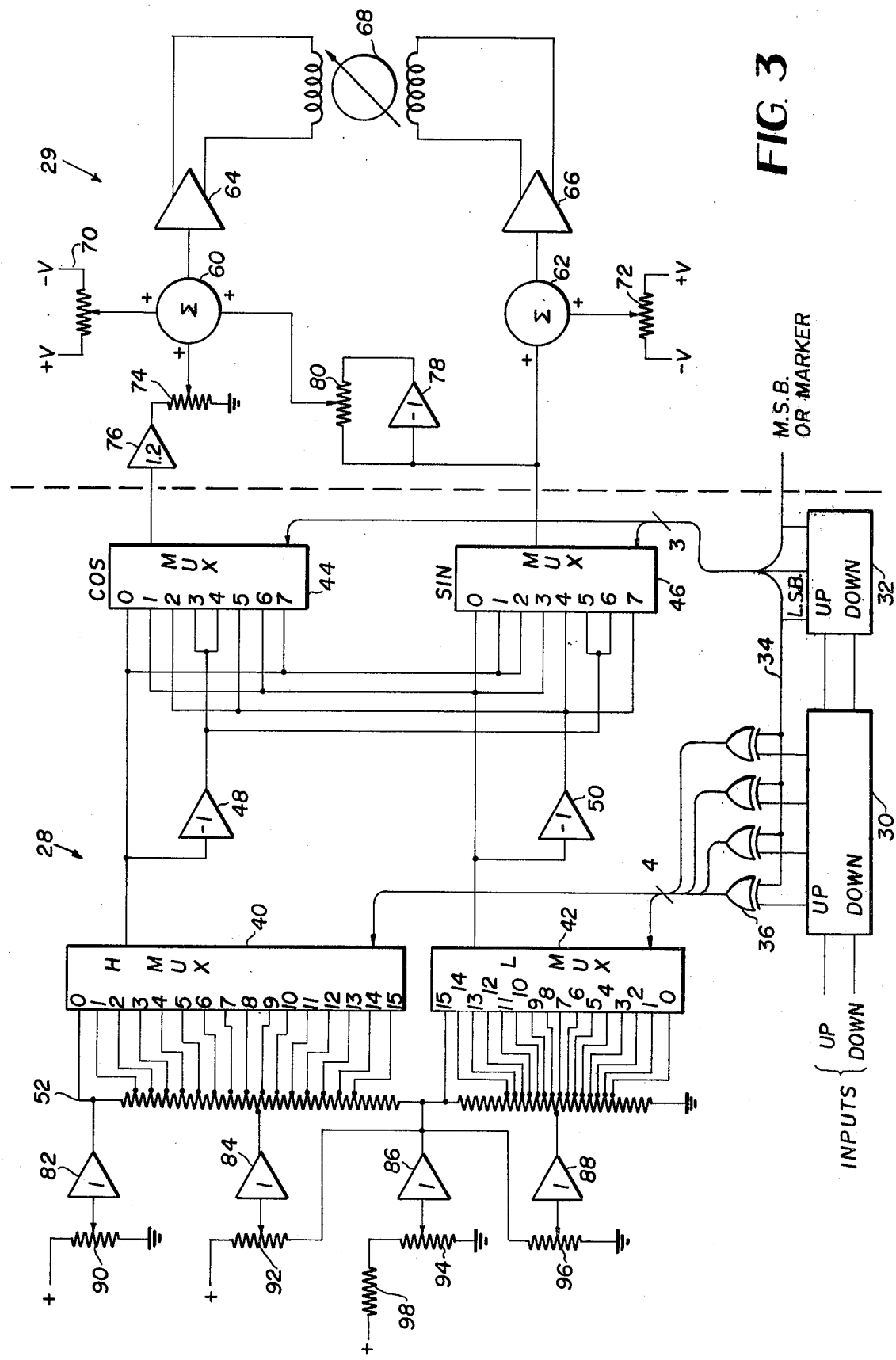
FIG. 3 is a schematic of a stepping motor drive as disclosed in my U.S. Pat. No. 4,100,471 improved to incorporate the adjustment principles of the present invention.

A stepping motor driver capable of being adjusted and used in the system of FIG. 1 is illustrated in FIG. 3, as including a position command section 28 for producing position command signal in response to an input and an energization signal section 29 responsive to position command signal for developing an energization signal for a stepping motor. The basic system which is shown and detailed and analyzed in my U.S. Pat. No. 4,100,471 includes two stage counters or other source of digital control, driving two sets of analog multiplexers. The selected analog signals are then applied to the output amplifiers of the type found in my U.S. Pat. No. 4,140,956. The output of the amplifiers energizes the windings of a stepping motor. For the purposes of illustration, a four phase motor 68 is shown, although the circuit of the present invention can be utilized for any stepping motor.

The counter or digital control are in two stages, 30 and 32. The least significant bit 34 of the second stage counter 32 is used to selectively invert the output of the first state counter 30 with exclusive OR gates 36. The effect of this circuitry is to create a control signal to first stage multiplexers 40 and 42 which selects inputs zero through fifteen, fifteen through zero, zero through fifteen, etc. Each passage between zero and fifteen of the multiplexer 40 and 42 is equivalent to 45° of the stepping motor's electrical cycle. The second stage multiplexers 44 and 46 create two waveforms in quadrature by selecting the outputs of multiplexers 40 and 42 or their negative values as created by inverting amplifiers 48 and 50.

Starting with an initial counter state of zero and progressing upward, the sine multiplexer 46 selects the low multiplexer 42 output. This multiplexer selects the lowest point in the voltage divider 52. As the counter value gets larger, the sine output is changed to higher and higher taps on the voltage divider. Upon the arrival of the sixteenth input pulse, the first stage counter 30 is a zero and the second stage 32 is a one. The exclusive OR gates 36 then invert the first stage zero to be a fifteen. The sine multiplexer then selects the high multiplexer 40 and the sine value continues to be selected further along the voltage divider as the first state counter 30 moves toward fifteen. Upon the thirty second input pulse, the first stage counter 30 is again zero, but the second stage counter 32 is a two. Then the sine output is retrieved from successively lower inputs until the sixty-fourth input. At this point, the sine input repeats the above multiplexer selections except that the second stage sine multiplexer 45 selects the appropriate negative values. Upon the one hundred twenty eight input pulse, the counters 30 and 32 are again at zero and the process repeats itself. The cosine multiplexer 44 is wired to select signals from the first stage multiplexers 40 and 42 and inverters 48 and 50 in a similar but thirty-two input pulses different which represents a 90° phase difference. The above selection order reverses when the counters are pulsed down instead of up.

The first and second stage counters 30 and 32 may be replaced by a digital register of a control system as disclosed in my co-pending application Ser. No. 34,102, filed Apr. 27, 1979. The form of the counters 30, 32 and exclusive OR gates 36 may also be changed to accommodate other counting modules. In this case, the first stage counter counts back and forth between two limits established by a binary number comparitor, the least significant bit of the second stage counter, and a direction input. The first counter steps toward the upper limit. When this limit is reached, the first counter is temporarily disabled and the second counter is stepped. This changes the direction input to the first counter and also changes the limit to the low value, generally zero. The first counter then counts until it reaches the low limit where it is again temporarily disabled and the second stage counter then increments. This reverses the first stage counter again, restores the high limit and puts the counter through one sub-cycle making the motor move one step.

The outputs of the sine and cosine multiplexers 44 and 46 which are position command signals are ultimately amplified by the amplifiers 64 and 66 for stepping motor 68. The amplifiers are preferably switching as disclosed in my U.S. Pat. No. 4,140,956, although they may also be linear. The intervening circuitry supplies two sets of motor compensations introduced with analog signal summers 60 and 62. DC offset levels are introduced with adjustment potentiometers 70 and 72. These adjustments are made when the most significant bit of the second stage counter 32, or marker has the same frequency as the above disclosed filter resonant frequency. The relative phase gain is adjusted by potentiometer 74. Amplifier 76 with its small gain of approximately 1.2 allows relative phase gains on either side of one inverting amplifier 78 and potentiometer 80 force some of the sine signal into the cosine phase to compensate for non-orthogonality between the phases. The phase gain and orthogonality adjustments are made when the marker frequency is half of the filter frequency.

The remaining compensation is performed upon voltage divider 52. Amplifiers 82 through 88 fix points within the voltage divider to be set by potentiometers 90 through 96. The remaining points of the divider produce linearly interpolated values based upon their position in the voltage divider and the values of the closer amplifiers or ground. Basically all of the resistors except the bottom resistor are the same value. The bottom resistor is half of the other values. The reasoning for this is discussed in my U.S. Pat. No. 4,087,732 and included herein by reference. Potentiometer 90 via amplifier 82 controls the top fourth of the voltage divider; potentiometer 92 via amplifier 84 controls the top half of the voltage divider; potentiometer 96 via amplifier 88 controls the bottom half of the voltage divider; finally, potentiometer 94 controls the entire divider via amplifier 86 potentiometers 92 and 96, and amplifiers 84 and 88.

A harmonic analysis of this driver shows that the voltage divider produces only odd harmonics in the driver output. The intensity of the harmonics are dependent upon the values of the voltage divider taps which are in turn dependent upon the potentiometer adjustments. Although each potentiometer affects all of the harmonics, the potentiometers affect each harmonic differently. The strategy, then, is to produce a series of adjustments which interact as little as possible. The interaction can be analyzed by harmonic analyses of the driver waveform as a function of the potentiometer settings and the analysis of motor behavior as presented by Patterson, et al.

The adjustment procedure for the potentiometers 90 through 96 is first to set these potentiometers to their nominal positions which are 100%, 60%, 100%, and 60%, respectively. Then to aid the phase gain and orthogonality adjustments, one of the two potentiometers 92 or 94 is adjusted to a lower level. Potentiometer 96 is adjusted at a marker frequency equal to one fourth of the filter frequency. Potentiometer 90 is then adjusted when the marker frequency is one eighth of the filter frequency.

The adjustments are then reiterated until satisfactory results are obtained. If the results are still not sufficiently smooth additional adjustment inputs may be used, or as a stop gap method, some voltage divider resistors may be shorted. This technique is employed in my U.S. Pat. No. 4,087,732.

The resistor 98 is used to limit the level of the center of the voltage divider to approximately 71% of the maximum. This helps limit the overall and peak power into the motor.

The configuration of potentiometers 90 through 96, amplifiers 82 through 88, and resistor 98 may be enhanced by additional adjustable potentiometers and amplifiers connected to other taps in the voltage divider to provide adjustment at other harmonics and to enhance the adjustment strategy.

From the preceding description of the preferred embodiments, it is evident that the objects of the invention are attained in that a method and apparatus are provided for adjusting a plurality of harmonics of a stepping motor and driver to achieve a minimization of resonance in combination with a new adjustable driver. Although the invention has been described and illustrated in detail, it is to be clearly understood that the same is by way of illustration and example only and is not to be taken by way of limitation. The spirit and scope of this invention are to be limited only by the terms of the appended claims.

What is claimed:

1. Method of adjusting a stepping motor driver for minimizing the effects of resonance comprising:
   driving a filter with a variable frequency source via a motor driver;
   measuring the frequency response of the filter;
   varying the frequency of the source until a maximum measurement is achieved;
   driving a stepping motor with said driver and source at the adjusted frequency;
   measuring the response of said motor through said filter; and
   adjusting the driver of said motor until a minimum measurement is achieved.

2. The method of adjusting a stepping motor driver according to claim 1 wherein measuring the response of said motor includes sensing the motion of said motor with a resonance device, filtering said sensed motion through said filter and indicating the output of said filter.

3. The method of adjusting a stepping motor driver according to claim 1 including driving said stepping motor at 1/N of said adjusted frequency where N is an integer representing a harmonic of interest, and adjusting said driver until a minimum measurement is achieved for each N.

4. The method of adjusting a stepping motor driver according to claim 1 including adjusting the relative gain of the current paths in said driver to the phase winding at the second harmonic of said adjusted frequency.

5. The method of adjusting a stepping motor driver according to claim 1 including adjusting the relative phase of the current paths in said driver to the phase windings at the second harmonic of said adjusted frequency.

6. Method of adjusting a stepping motor driver for minimizing the effects of resonance comprising:
   driving a stepping motor with a driver at a frequency so that the fundamental or other desired harmonic of the stepping motor position command signal from said driver is approximately equal to the resonant frequency of a filter;
   measuring the response of said motor through said filter; and
   adjusting the driver of said motor until a minimum response is achieved.

7. Method of adjusting a stepping motor driver for minimizing the effects of resonance comprising:
   driving a stepping motor by a driver at a frequency;
   adjusting a filter so that it selects the fundamental frequency of the position command signal from said driver or other desired harmonic thereof;
   measuring the response of said motor through said filter; and
   adjusting the driver of said motor until a minimum response is achieved.

8. A system for minimizing the effects of resonance in a stepping motor comprising:
   an adjustable stepping motor driver for producing motor drive signals;
   a variable frequency source providing a source signal to said driver;
   a sensor means for sensing the motion of a stepping motor;
   a filter means connected to the output of said sensor means; and
   an indicator means connected to the output of said filter for indicating the amplitude of the filters means output;
   said driver being adjusted at the resonant frequency and 1/N the resonant frequency thereof to minimize the indicated output of said filter.

9. The system according to claim 8 including switch means for selectively interconnecting said filter means to said driver or said sensor means whereby said variable frequency source can be varied to adjust the fundamental frequency of said driver to the center frequency of said filter means by connecting said driver to said filter means and said driver adjusted at said fundamental frequency or 1/N thereof by connecting said sensor to said filter.

10. The system according to claim 8 wherein said variable frequency source includes a variable modulo counter for producing 1/N of an adjusted frequency of said variable frequency source.

11. The system according to claim 8 wherein said driver includes means for adjusting the relative phase angle between the phase windings driver signals.

12. The system according to claim 8 wherein said driver includes means for adjusting the relative gain between the phase winding driver signals.

13. The system according to claim 8 where said indicator means includes a display of the relative phase of the filter output and the driver fundamental frequency.

* * * * *